Feb. 3, 1953            G. I. GOODWIN            2,627,332
CLUTCH PLATE
Filed Jan. 2, 1948            2 SHEETS—SHEET 1
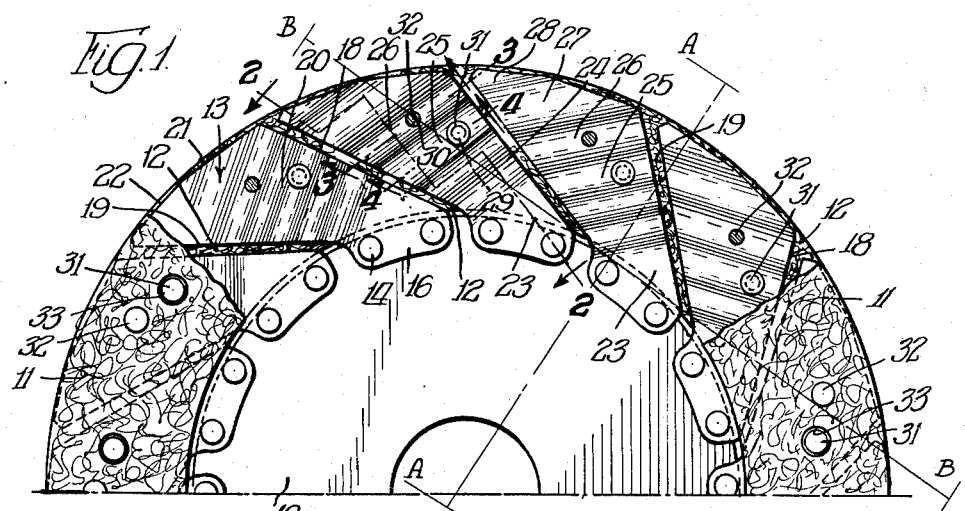
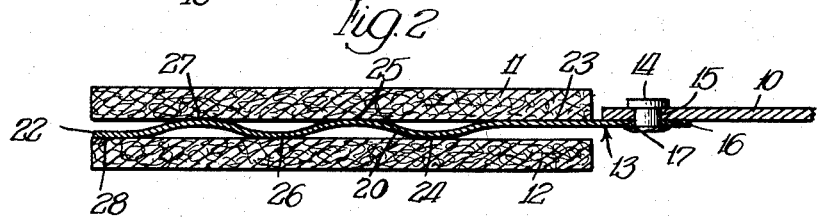
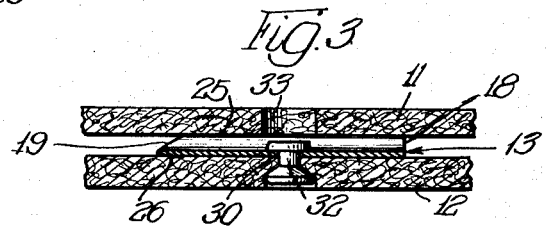
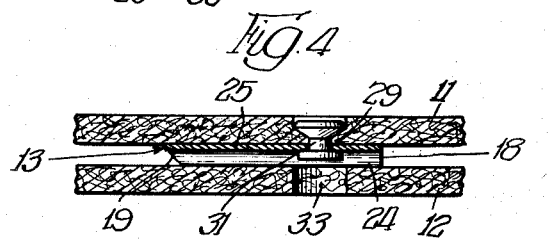
INVENTOR.
George I. Goodwin
BY
Cromwell, Greist + Warden
ATTYS.

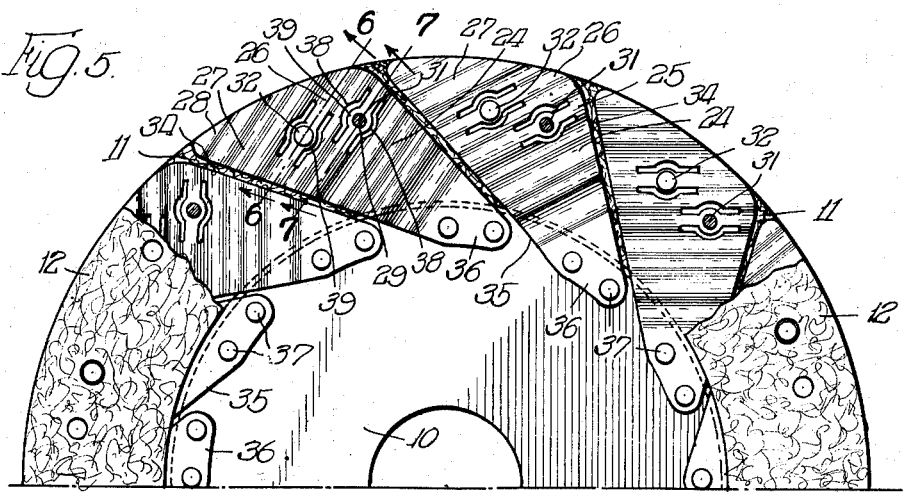
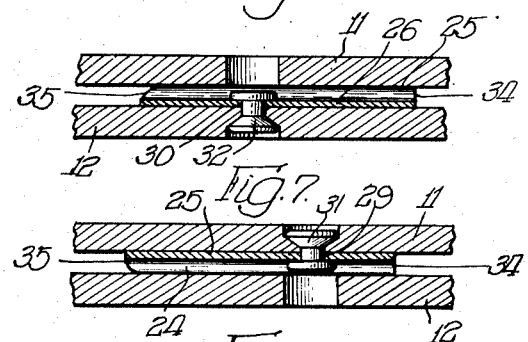
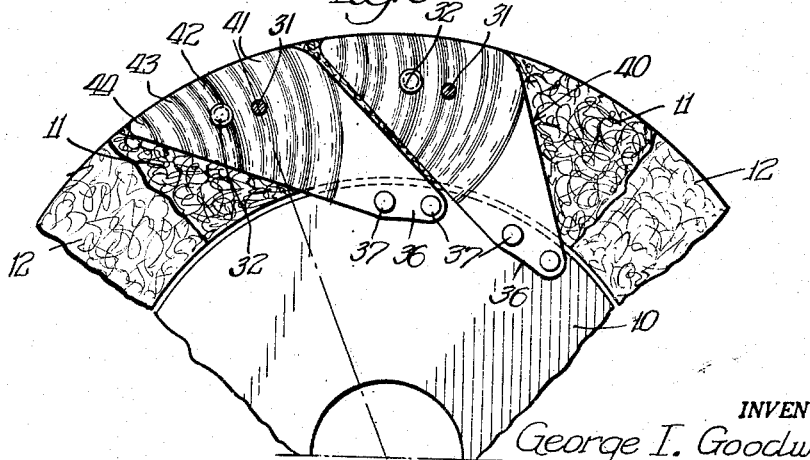

Patented Feb. 3, 1953

2,627,332

UNITED STATES PATENT OFFICE 2,627,332

CLUTCH PLATE

George I. Goodwin, Birmingham, Mich.

Application January 2, 1948, Serial No. 41

6 Claims. (Cl. 192—107)

This invention pertains generally to an improved clutch plate structure for automotive and related installations, and more particularly to a novel and increasedly effective cushion member or spring for such a clutch plate assembly.

Present day advancement in the development of high compression automobile engines, likewise the evolution of the popular, extremely low body silhouette, calling for small wheels and a low road clearance, yet with ample passenger and foot room within the automobile body, have imposed certain demands on the design of the automotive clutch assembly and component clutch plates thereof which are quite contradictory and inconsistent with one another. Thus, the high torque characteristic of the engine obviously calls for a clutch having high torque transmitting capacity. This end would normally be accomplished by increasing the diameter of the clutch plates of the assembly, or by increasing the axial thrust thereof, or both. However, considerations affecting the matter of body design preclude recourse to these expedients, even if they were not prohibited by the factor of an objectionably high polar spinning inertia which would accompany an increase in radial dimensions.

Torque transmitting capacity is proportional to the mean radius of the facing of the clutch. However, an increase in facing diameter involves an increase in the size of the clutch housing, which subtracts from the foot room in the automobile body or from road clearance or both. Torque capacity is also proportional to the axial clutch pressure. However, there is a definite acceptable limit as to the clutch actuating load which can be imposed on the automobile operator at the clutch pedal. An increase in spring load is therefore an objectionable factor from the standpoint of automobile customer appeal.

A solution of the problem of reconciling a high torque transmitting capacity of a clutch with a fixed maximum permissible over-all clutch size and pressure can be had only by devising the clutch plate in such fashion that its components are interrelated with one another in the most efficient manner and most efficiently utilize the space available therefor.

In accomplishing this end I have provided a clutch plate which is characterized by a novel and improved cushion structure and an improved manner of associating the cushions relative to one another and to the mounting disk on which they are secured. This is done for the purpose of presenting a maximum number of springing zones to the clutch facings on opposite sides of the cushions, within a practical limit which is involved if an excessive number of small, relatively abruptly angled or curved springing zones are employed, tending to fatigue failure. Nevertheless, a substantial number, or a multiplicity, of such zones are employed, in order to enable the use of cushions which are fabricated of relatively thin, high quality, resilient steel stock.

Other features of the cushions such as the character of the shaping thereof and the radial and circumferential overlapping thereof for maximum distribution and efficiency of their springing action are brought out in the description to follow.

Most efficient use of the available space of the clutch plate is also made in the attachment of the aforesaid cushion members to the mounting disk. In order to reduce the polar moment of inertia of the clutch plate this mounting disk is fabricated of the thinnest possible material which can stand up under the stress of the driving torque, and the cushions are secured to the outermost peripheral portion of the mounting disk in a manner to utilize both the cushion and disk in the most efficient manner.

It is therefore a general object of the invention to provide a clutch plate including spring cushions and a mounting disk, in which said cushions are devised in shape and are so related to one another to act with maximum efficiency in transmitting spring load, and in which the cushions are assembled to the mounting disk in a fashion to further the end of obtaining maximum efficiency of use of the available clutch plate space.

It is a further object of the invention to provide a cushion for a clutch plate of the type including a supporting disk or plate assembly on which a plurality of the cushions are adapted to be rigidly attached for coaction with a pair of clutch facings, said cushions being of a novel outline and sectional configuration and being radially and circumferentially overlapped relative to one another about the periphery of said assembly in a novel manner, thereby to afford a substantially continuous and uniform distribution of cushioning effect, circumferentially of the assembly and between said facings.

Another object is to provide an improved resilient sheet metal clutch cushion including a circumferentially extending wing portion of novel sectional shape and exterior configuration and an integral attaching portion, which cushion is well suited for use in the above type of clutch plate assembly and is amply strong to withstand weakening stresses in the operation of the clutch plate.

A still further object is to provide an improved clutch plate cushion having a novel flared, undulatory cushion area or wing and an attaching portion for securing the cushion to a supporting disk, which portion is of a minimum area consistent with its function of attaching the cushion to the supporting disk in a strong and rigid fashion.

Yet another object is to provide a clutch plate and cushion therefor having the foregoing features, and additionally characterized by a novel disposition of the springing zones and facing rivet receiving provisions to minimize destructive stress on a facing in operation and to generally increase the efficiency of the structure.

A further object is to provide a clutch plate cushion having undulatory springing areas extending thereacross in a novel outline and relationship, thereby making a fuller use of the material in the cushion member and enabling the use of a thinner material so as to reduce the thickness and the spinning inertia of the cushion members, while at the same time maintaining the desired resistance to compression.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 1 is a face view illustrating half of an automotive clutch plate embodying the principle of the invention, a portion of a clutch facing component thereof being broken away for clarity;

Figs. 2, 3 and 4 are, respectively, enlarged fragmentary views in section on lines corresponding generally to lines 2—2, 3—3 and 4—4 of Fig. 1;

Fig. 5 is a view similar to Fig. 1 of a modified form of the invention;

Figs. 6 and 7 are fragmentary sectional views, enlarged in scale, on lines 6—6, 7—7 respectively of Fig. 5; and Fig. 8 is a fragmentary face view, partially broken away of a clutch plate according to a still further modified embodiment of the invention.

Referring to Fig. 1 of the drawings, the clutch plate assembly comprises a central mounting disk 10, which is adapted to be fixedly secured in well known manner to a rotative shaft, and to which a pair of annular friction clutch facings 11, 12 are concentrically secured by a plurality of undulatory cushion members 13. Members 13 are attached to disk 10 by rivets 14 extending through pairs of holes 15 arranged around the disk periphery and spaced only slightly inwardly of the periphery.

The present invention primarily deals with the cushion members 13 and the relationship thereof to one another and to the mounting disk, or equivalent member on which they are borne. Hence, it is not deemed necessary to further enlarge on the structural details of the disk 10 and facings 11, 12. They are to be regarded as conventional in all respects and their purpose and operation are well understood by those skilled in the art. It should also be understood that the invention is equally well adapted for use in a clutch plate of either the rigid or flexible center type.

The individual cushions 13 are shaped on their radially innermost side to afford an attaching heel 16 of substantial lateral or circumferential dimension, said heel being provided with a pair of openings 17 which are spaced in accordance with the spacings of the disk rivet holes 15, in order to receive the rivets 14. The cushion flares radially outwardly and in a circumferential direction between the opposed side margins 18 and 19 which define the undulatory main wing 20 of the cushion. The angularity of these margins, with reference to the axis of the disk 10, is different, in order to produce the outwardly and angularly flared character of the wing, and these margins 18 and 19 are joined by an outer or peripheral margin which may be chord-like in outline, as shown. Said margin includes chord segments 21 and 22 lying within the outer diameter of the respective clutch facings 11, 12.

The undulatory wing 20 of the cushion 13 is provided with alternating convex crests and concave valleys or low areas to impart the aforesaid undulatory or wavy sectional shape thereto which is illustarted in Fig. 2. Thus, a flat inner area 23 which is coplanar with and merges into the heel 16 lies flush against the facing 12 for a substantial radial distance, from which flat area the wing is shaped to afford parallel alternating crests and valleys at 24, 25, 26, 27 and 28 successively. The crests 24, 26 and 28 engage the facing 11 while the valleys or lows 25 and 27 are coplanar with the flat area 23, and, like the latter, engage the other facing 12. The facings are secured to cushions 13 in the manner hereinafter described.

These crests and valleys extend angularly across the wing 20 of the cushion, being disposed at a substantial angle to both a radius of the disk 10, such as the line A—A, and a tangent thereto located at its intersection with the outer periphery of disk 10, such as line B—B, in the fashion clearly illustrated in Fig. 1. Hence, on any of a plurality of radial lines through any given cushion, the latter engages both facings axially at its area 23 and crests and valleys. Moreover, the closely related circumferential arrangement or nesting of the cushions insures that, at a large number of radii through the axis of the disk 10, two cushions are effective on the opposed facings, there being one or more crests and valleys of each of two successive cushions disposed on a radius such as the line A—A. The result is a definitely increased and very desirable uniformity of distribution of the cushioning action circumferentially of the clutch plate facings.

As illustrated in Figs. 1, 3 and 4, the cushions are provided with rivet receiving holes on the adjacent valleys 25 and crests 26 thereof, said holes being designated by the respective reference numerals 29, 30, to receive rivets 31, 32 by which the cushions are secured to the opposed facings 11, 12 thereby supporting said facings concentrically in operative relation to the remainder of the structure. Each facing is apertured at 33 to accommodate the heads of the rivets fastening the other facing to the cushions, thus affording clearance for the opposite rivet end.

The present cushion structure is notable for the effect of a circumferentially continuous and uniformly distributed support for the facings which it contributes, due to the above described substantial angular and radial overlapping of the undulatory springing areas thereof. Futhermore, a minimum of the area of the cushion i. e., the heel 16, is devoted to the non-springing function of attaching the cushion to the supporting disk structure. Nevertheless there is ample width of material adjacent the attaching rivets 14 at said heel to afford desired strength and resistance to weakening or fracturing at this critical zone at which the cushion is sustained. The necking down of the cushion at this zone, which is characteristic of conventional structures, is completely avoided.

It will be noted, particularly with reference to Fig. 1, that the shaping of the cushions, as described above, enables the latter to be secured to the mounting disk 10 by rivets 14 which are spaced substantially uniformly relative to one another, both as regards the spacing of a pair of rivets for a given cushion and the spacing of adjacent rivets of succeeding cushions. This is basically an ideal condition, which has been coupled with the idea of making most efficient use of the peripheral portion of the mounting disk in the attachment of the cushions. In as much as the thickness of the mounting disk is kept at a minimum adequate to handle the driving torque stress, the factor of spacing of the rivet holes has substantial importance.

The modified forms of the invention shown respectively in Figs. 5-7 inclusive and Fig. 8 incorporate the above described features, plus other details contributing to a longer and more efficient life of the clutch plate structure. Referring to Figs. 5, 6 and 7, it will be noted that the distinctly defined attaching heel characterizing the embodiment of Figs. 1-4 inclusive has been eliminated by bringing the angled sides 34, 35 of the cushion inwardly in linear fashion for the full length of the cushion, so that said sides merge with a small heel portion 36, in which the rivets 37 for attaching the cushion to disk 10 are located.

The disposition of ridges and valleys of the springing or wing portion of the cushion is generally the same as that described relative to the first embodiment, hence like reference characters are employed to designate the portions. It will be noted that a pair of opposed arcuate shaped bracket-like slots 38 are provided in the ridge and valley 25, 26, respectively, through which the rivets 31, 32 are disposed. These slots embrace the portions 39 of the cushion in which rivet holes 29, 30 respectively are punched, thereby tending to free said portions somewhat from the remainder of the cushion and to render the same independently flexible in the plane of the cushion.

It will be appreciated that the material of the cushion must shift slightly in the direction of its length as its ridges and valleys are compressed axially in operation. Normally this would result in a slight movement of the facing rivet holes in the cushion away from the disk 10, whereas the facing secured by the rivets does not shift. Hence, the partially freed portions 39 are able to yield individually and permit the slight linear shifting in the normal flexure of the cushion wings without pronounced tearing or shearing stress being imposed by the rivets on the material of facings 11, 12. Full freedom of action of the cushions also results from the elimination of restrictive action on the cushions by the rivets. Various shapes and types of slotting, slitting or other configuration of the cushion which will afford the above advantages will suggest themselves to those skilled in the art.

I have provided the modified construction illustrated in Fig. 8 for the same purpose, described above, of accomplishing a more effective and efficient use of the material in the cushion spring. In this embodiment, the respective ridges and valleys of the cushion, which is generally designated 40, are set up in the shape of arcs, as distinguished from a straight or linear form. These may advantageously be circular curves through the facing rivet holes, arranged tangent to radii of the clutch disk 10 which extend through said respective facing rivet holes. As illustrated, the alternate arcuate ridges and valleys 41, 42, 43, 44 are disposed in general concentricity, concave in the direction toward the outer extremity of the cushion. The arrangement is such that the facings 11, 12 will rotate slightly on the cushion members during engagement, which conforms to normal practice.

The inherent characteristic of the curved spring outline of most fully employing the material of the cushion in either compression or tension across its sectional dimensions enables the thickness of the material of the cushion to be substantially reduced, yet produces the same degree of resilience and degree of support as a thicker cushion. In this way the cost of the material is reduced and a lower polar moment of inertia is effected by the reduction of the spinning weight of the cushions. The need for a floating connection of the cushions to the facings, such as is represented by the portions 39 defined by slots 38 in Fig. 5, is eliminated in this embodiment.

I claim:

1. In a clutch plate structure, a supporting disk and a plurality of resilient sheet-like cushion members secured thereto in radially and circumferentially overlapping relation to one another about the periphery of the disk, said disk having a plurality of circumferentially arranged rivet receiving holes spaced approximately equally thereabout adjacent the periphery thereof, each of said members having an inner attaching portion secured to said disk by a plurality of securing elements extending through said holes and a circumferentially inclined cushion wing adjoining and merging directly with said attaching portion, said wing being defined by spaced, substantially uninterrupted side margins diverging outwardly relative to one another but inclined in like circumferential relation to the disk, which margins merge directly with the margins of said attaching portion, said cushion wings each being provided with a plurality of undulatory cushion areas extending transversely of the wing, a radius of said disk intersecting the cushion wings of an overlapped pair of said members.

2. In a clutch plate structure, a supporting disk and a plurality of resilient sheet-like cushion members secured thereto in radially and circumferentially overlapping relation to one another about the periphery of the disk, each of said members having a small inner attaching portion secured to said disk immediately adjacent the periphery thereof and a circumferentially inclined cushion wing adjoining and merging directly with said attaching portion, said wing being defined by spaced, substantially uninterrupted side margins diverging outwardly relative to one another but inclined in like circumferential relation to the disk, which margins merge directly with the margins of said attaching portion, adjacent margins of successive cushion member wings being disposed in close relationship to provide said overlapping relation of the members, a radius of said disk intersecting the cushion wings of an overlapped pair of said members, said cushion wings each being provided with a plurality of undulatory cushion areas extending transversely of the wings in angular relation to a radius and tangent of said disk at said cushion member.

3. A clutch plate structure in accordance with claim 2, in which certain of said undulatory cushion areas are perforated to receive a facing attaching rivet, the perforated portion being at least partially separated from the surrounding area of the cushion wing so as to shift independently thereof.

4. In a clutch plate structure, a supporting disk and a plurality of resilient sheet-like cushion members secured thereto in radially and circumferentially overlapping relation to one another about the periphery of the disk, each of said members having an inner, flat attaching portion of relatively small area which is attached to said disk immediately adjacent the periphery thereof and a cushion wing adjoining said attaching portion, said wing being defined by spaced substantially uninterrupted side margins diverging outwardly relative to one another but inclined in like circumferential relation to the disk, which margins merge directly with the margins of said attaching portion, adjacent margins of successive cushion member wings being disposed in close relation to provide said overlapping relation of the members, a radius of said disk intersecting the cushion wings of an overlapped pair of said members, said cushion wings each being provided with a plurality of parallel undulatory cushion areas extending transversely of the wing between said margins in angular relation to a radius and tangent of said disk at said cushion member and one of said areas merging directly with said flat attaching portion.

5. A clutch plate comprising a mounting disk and a plurality of cushions disposed in closely adjacent relation around the periphery of said disk, said cushions each comprising an attaching heel of limited peripheral extent which is secured to the disk, and a cushion wing integral with said heel and projecting substantially outwardly therefrom, said wings extending radially of the disk and being inclined in a common circumferential direction to thereby enable the assembly of the cushions in said closely adjacent relation, said wing having undulatory configurations of arcuate shape therein which are adapted for cushioning engagement with clutch facings, said configurations being in generally concentric arrangement and disposed with the concavity thereof facing the outer extremity of the wing.

6. A clutch plate comprising a relatively thin, circular mounting disk provided with a plurality of circumferentially arranged holes which are spaced substantially uniformly thereabout adjacent the periphery thereof, and a plurality of spring cushions extending outwardly of said disk, each of said cushions including an attaching portion of slight area secured to said disk by a plurality of rivets extending through successive holes in said disk and having a springing portion of area multiple that of said attaching portion which extends radially and circumferentially from said attaching portion, said springing portion having opposed side margins which are substantially uninterrupted and rectilinear in outline and merge directly with circumferentially spaced sides of said attaching portion, said side margins of said springing portion being disposed in inclined relation at acute angles to a given radius of said mounting disk through one of said margins, and to a tagent of the disk intersecting said radius, said springing portion being provided with a multiplicity of parallel, alternating and oppositely facing undulations which also are inclined to said radius and tangent.

GEORGE I. GOODWIN.

REFERENCES CITED

The following references are of record in the file of this patent:

UNITED STATES PATENTS

| Number | Name | Date |
|---|---|---|
| 2,110,051 | Nutt et al. | Mar. 1, 1939 |
| 2,209,950 | Goodwin | Feb. 2, 1943 |
| 2,324,913 | Daukus | July 20, 1943 |
| 2,333,308 | Goodwin | Nov. 2, 1943 |
| 2,337,097 | Geyer | Dec. 21, 1943 |
| 2,380,835 | Goodwin | July 31, 1945 |